S. L. WILEY.
Bell-Joint for Coupling Metal Pipes.
No. 220,322. Patented Oct. 7, 1879.
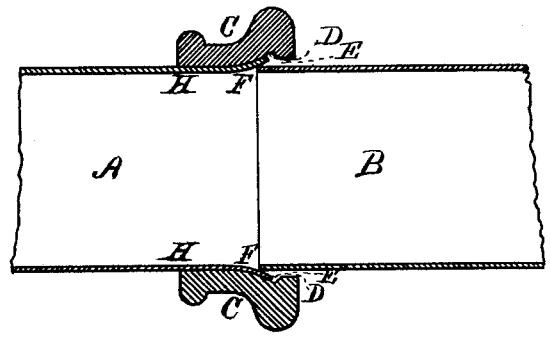
Witnesses;
Inventor;

UNITED STATES PATENT OFFICE.

SOLON L. WILEY, OF GREENFIELD, MASSACHUSETTS.

IMPROVEMENT IN BELL-JOINTS FOR COUPLING METAL PIPES.

Specification forming part of Letters Patent No. 220,322, dated October 7, 1879; application filed August 18, 1879.

*To all whom it may concern:*

Be it known that I, SOLON L. WILEY, of Greenfield, in the county of Franklin and Commonwealth of Massachusetts, have invented a new and useful Improvement in Bell-Joints for Coupling Metal Pipes, and that the following is a true and full specification of the same.

My invention is particularly intended for forming connections in the joints of wrought-metal pipes for conducting water, gas, and condensed air, though it may be used for a larger size of cast-iron pipes for any use.

The trouble in making a water and gas tight connection in wrought-iron pipes is well known, and still greater is the difficulty of bending at a desired angle such pipes with ordinary connections.

My invention enables wrought-iron pipes of any diameter to be united without weld, screw, or rivet, and in such a manner as to be gas-tight and susceptible to deflection at any angle.

In the drawing, A represents a section of wrought-iron pipe, with its end swaged out in a bell form, around which is a metal collar, C, usually of iron, cast, malleable, or wrought. B is a section of another pipe, entering the bell-mouth of A.

The collar C is to be made of sufficient strength to resist the pressure from driving the end of the pipe B into the flaring end of A, and is made of cast or malleable iron, or it may be wrought out. Around the inside of this collar, and near what may be called the "front" end, it is rabbeted or undercut, forming in front a shoulder, D, but curved in at its rear end to fit closely on the flaring end of the pipe A. The front end of the collar is a little larger than the diameter of the pipe which enters it, enough so to receive a packing of lead, oakum, or any other preparation desired.

In using my device, I swage the end of a pipe, cold or hot, to give it the desired bell form. The collar C, being heated to its largest amount of expansion, is then slipped over the pipe and driven up while hot as far as possible onto the flaring end. In cooling the contractile force is great enough to indent to a small degree the pipe around which it closes, making a perfectly tight and immovable joint.

The end of the next length of pipe, having been previously prepared, is entered into the flaring end of the first length, and driven sufficiently to hold.

The packing, whether of lead or any other substance, is then run or driven in solidly.

As this collar may also be used to advantage on larger pipes of cast-iron without swaging, the lead forming the packing will run into and fill the slot on the inside of the collar at the shoulder D, and also the space E.

It will be seen that thus a rigid connection is made that is impervious by water, gas, or compressed air.

What I claim, and desire to secure by Letters Patent in the connection of iron pipes, is—

1. The collar C, made a little larger than the end of the pipe on which it is to be shrunk, and provided with a rabbet or undercut, E, and shoulder D, to receive the enlarged end of the pipe and the packing, all substantially as described and set forth.

2. The method of coupling iron pipes by swaging the end of one to expand it to receive its fellow, and then placing the rabbeted collar over the first and driving it home, to form a close joint before introducing the usual packing in the space formed between the said collar and second pipe, as specified.

3. The collar, with an inside rabbet, as described, and shrunk onto one pipe, in combination with the other connecting-pipe, as specified.

SOLON L. WILEY.

Witnesses:
A. LANDON,
S. R. ZELLER.